US008624865B2

(12) United States Patent
Chang (10) Patent No.: US 8,624,865 B2
(45) Date of Patent: Jan. 7, 2014

(54) DEVICE FOR IMPROVING THE ACCURACY OF THE TOUCH POINT ON A TOUCH PANEL AND A METHOD THEREOF

(75) Inventor: Chin-Fu Chang, Sinjhuang (TW)

(73) Assignee: Egalax Empia Technology Inc., Taipei (TW)

( * ) Notice: Subject to any disclaimer, the term of this patent is extended or adjusted under 35 U.S.C. 154(b) by 1368 days.

(21) Appl. No.: 12/213,495

(22) Filed: Jun. 20, 2008

(65) Prior Publication Data

US 2009/0166097 A1 Jul. 2, 2009

(30) Foreign Application Priority Data

Dec. 31, 2007 (TW) .............................. 96151555 A (51) Int. Cl.
*G09G 5/00* (2006.01)
(52) U.S. Cl.
USPC ....................................... 345/174; 178/18.03
(58) Field of Classification Search
USPC ..................... 345/173–179; 178/18.01–18.11
See application file for complete search history.

(56) References Cited

U.S. PATENT DOCUMENTS

| 4,650,926 | A | * | 3/1987 | Nakamura et al. | ......... | 178/18.02 |
| 4,698,460 | A | * | 10/1987 | Krein et al. | ................... | 345/173 |
| 5,552,568 | A | * | 9/1996 | Onodaka et al. | ........... | 178/18.03 |
| 7,952,563 | B2 | | 5/2011 | Park et al. | | |
| 2006/0031786 | A1 | | 2/2006 | Hillis et al. | | |
| 2006/0279548 | A1 | | 12/2006 | Geaghan | | |
| 2007/0291011 | A1 | | 12/2007 | Chang | | |

FOREIGN PATENT DOCUMENTS

| CN | 1744023 | | 3/2006 |
| CN | 101105733 | | 1/2008 |
| TW | 200634635 | A | 10/2006 |
| TW | 200709023 | A | 3/2007 |
| WO | 2008138208 | | 11/2008 |

OTHER PUBLICATIONS

Communication from a foreign patent office in a counterpart foreign application dated Aug. 25, 2011.

* cited by examiner

*Primary Examiner* — Regina Liang
(74) *Attorney, Agent, or Firm* — WPAT, PC; Justin King (57) ABSTRACT

A device for improving the detection accuracy of a touch point on a touch panel and a method thereof are disclosed. The device includes a plurality of first and second X external conducting wires and a plurality of first and second Y external conducting wires that are electrically coupled with the first X side and the second X side of the touch panel and the first Y side and the second Y side of the touch panel to alternatively and respectively receive a first detection signal and a second detection signal from a first detection signal source and a second detection signal source. By using the relation of the currents generated form the first detection signal and the second detection signal, a x coordinate and a y coordinate of the location of the touch point is obtained.

12 Claims, 10 Drawing Sheets

DEVICE FOR IMPROVING THE ACCURACY OF THE TOUCH POINT ON A TOUCH PANEL AND A METHOD THEREOF

BACKGROUND OF THE INVENTION

1. Field of the Invention

The present invention relates to a touch panel. In particular, this invention relates to a device for improving the accuracy of the touch point on a touch panel and a method thereof.

2. Description of the Related Art

Traditionally, the input of an electronic device is implemented by a keyboard or a mouse. However now touch panels are extensively applied to a variety of electronic devices, the user can use fingers or touch pens to click the touch panel to input data to the electronic devices. A sensor located below the touch panel senses the touch point's location to operate the electronic device. According to the detection mechanism for sensing the touch point's location, the touch panel can be divided into a resistive type, a capacitive type, an acoustic wave type, an optical type, and an electromagnetic type. According to the kind of the touch panel, the touch panel can be divided into a touch panel and a touch pad.

For a capacitive touch panel that uses the capacitive type touch detection mechanism, it detects the currents from each sides of the touch point and uses the currents to determine the touch point's location.

Figure 1:
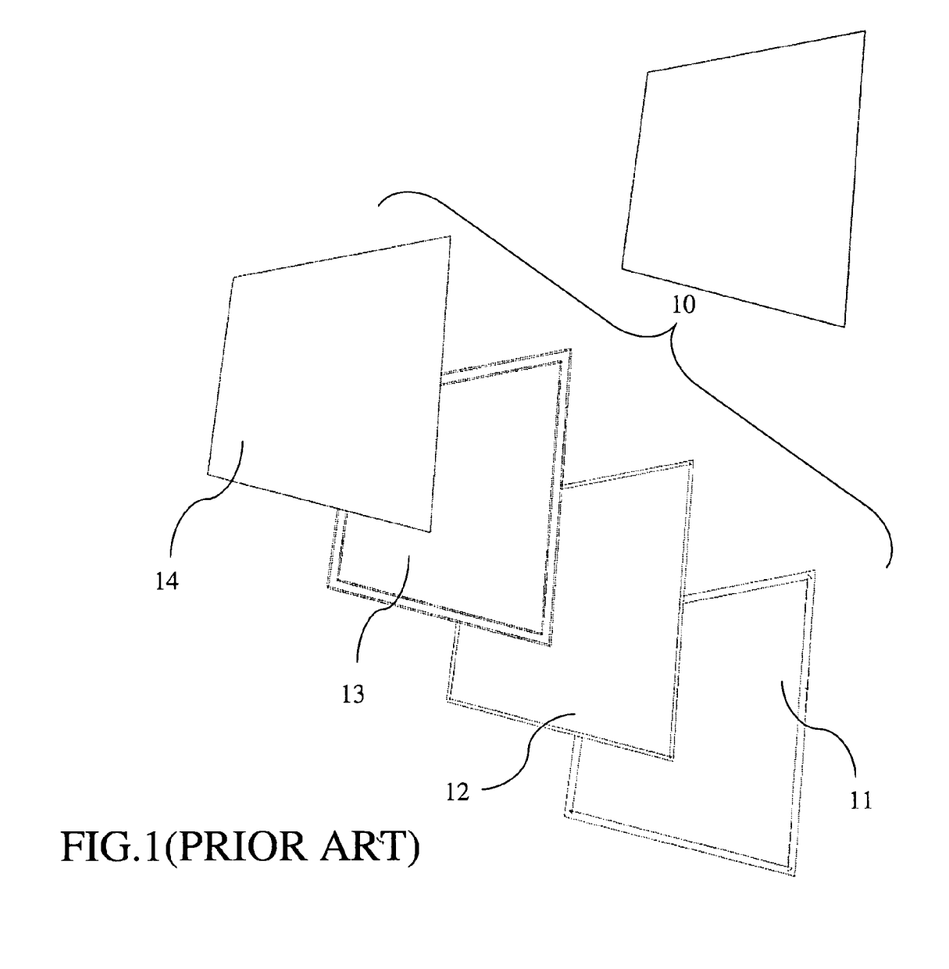
FIG. 1 is an exploded perspective view of the capacitive touch panel of the prior art.

Reference is made to FIG. 1, which shows a schematic diagram for detecting the touch point location on the capacitive touch panel in the prior art. The capacitive touch panel 10 is composed of a transparent substrate layer 11, a conductive metallization layer 12, an electrode pattern layer 13, and an insulation hard plating layer 14. The transparent substrate layer 11 can be a glass. The electrode pattern layer 13 is formed on the edge of the touch panel 10 for compensating the electric field distribution above the conductive metallization layer 12. Furthermore, when viewed in conjunction with FIG. 2, each of the four corners of the touch panel 10 is connected with each of external conducting wires A, B, C, D for receiving each of the AC detection signals, AC1, AC2, AC3, and AC4 that are used for determining the touch point location P on the touch panel 10.

Figure 2:
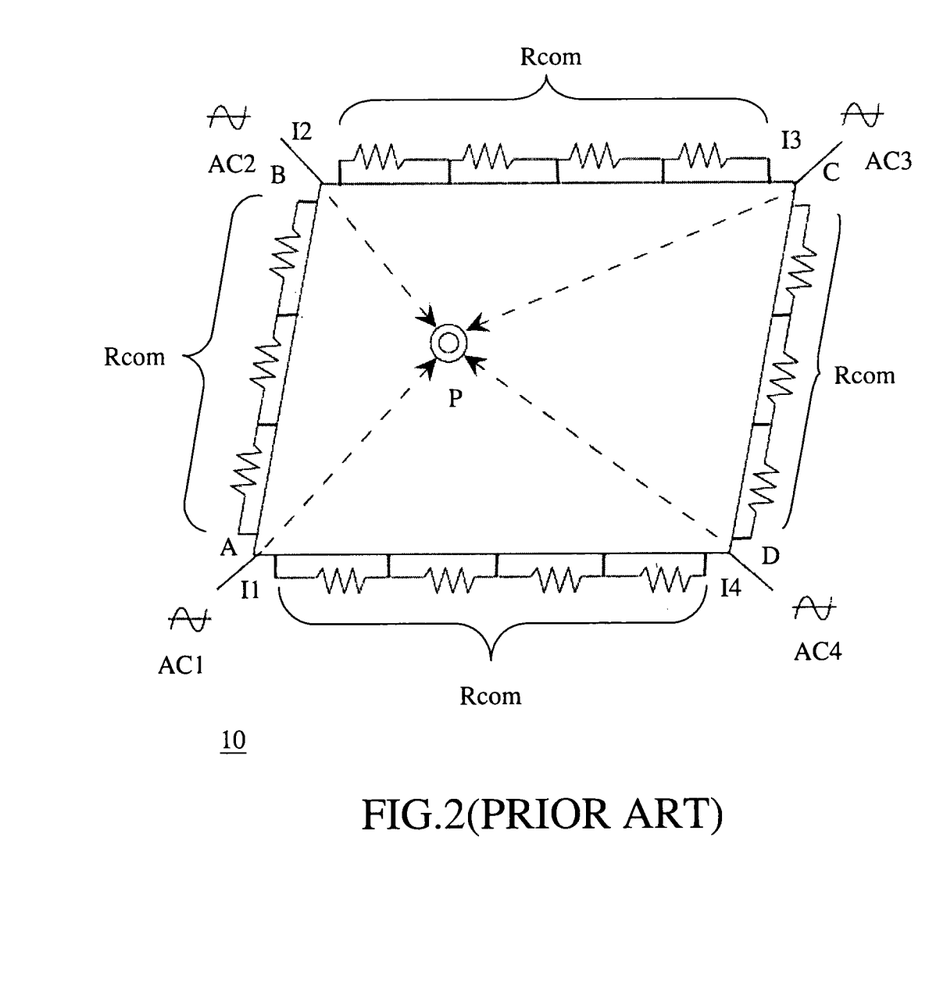
FIG. 2 is a schematic diagram of how to receive the detection signal to determine the location of a touch point by the capacitive touch panel in FIG. 1.

The AC detection signals, AC1, AC2, AC3, and AC4, are AC square wave voltage signals or AC sine wave voltage signals, and their amplitude are the same as each other. At this time, each of currents I1, I2, I3, I4 respectively flows through each of the external conducting wires A, B, C, and D. By measuring the current variations $\Delta I1$, $\Delta I2$, $\Delta I3$ and $\Delta I4$ at the external conducting wires A, B, C, D of before the user touches the touch point P and of when the user touches the touch point P, the coordinates of the touch point P can be calculated by the following formulas.

$$x = (\Delta I3 + \Delta I4 - \Delta I1 - \Delta I2)/(\Delta I1 + \Delta I2 + \Delta I3 + \Delta I4) \quad (1)$$

$$y = (\Delta I1 + \Delta I4 - \Delta I3 - \Delta I2)/(\Delta I1 + \Delta I2 + \Delta I3 + \Delta I4) \quad (2)$$

Figure 3:
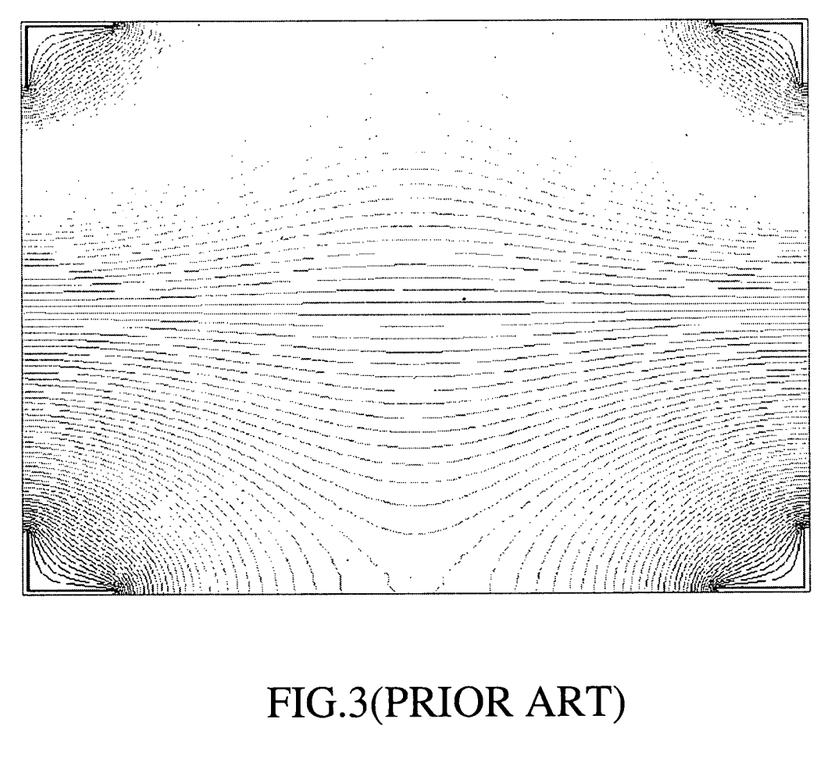
FIG. 3 is a distribution diagram of the electric field of the capacitive touch panel in FIG. 1 being detected.
Figure 4:
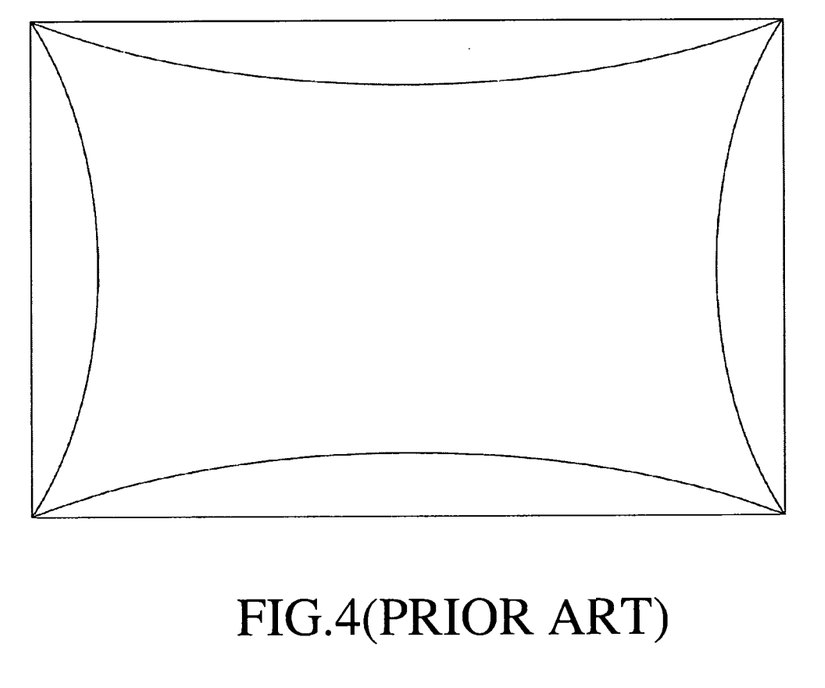
FIG. 4 is a distribution diagram of the equipotential lines of the electric field in FIG. 3.
Figure 5:
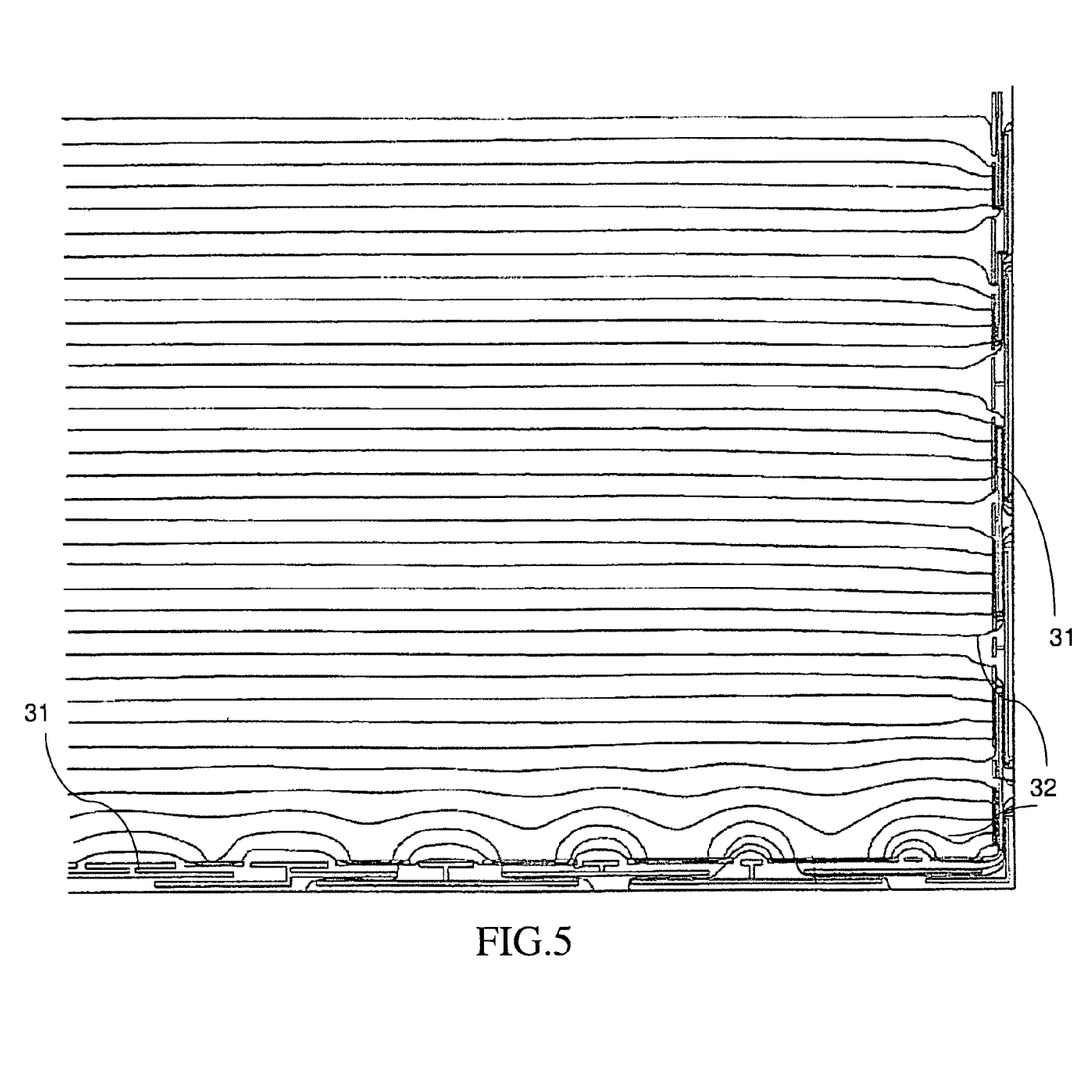
FIG. 5 is a distribution diagram of the equipotential lines of the capacitive touch panel in FIG. 1 being compensated.

However, if the touch panel 10 does not have the electrode pattern 13, the distribution of the electric filed of the AC detection signals, AC1, AC2, AC3, and AC4 on the touch panel 10 would be curved, as shown in FIG. 3. The electric filed distribution curve in FIG. 3 forms equipotential lines in FIG. 4. The location of the touch point P would be inaccurate. For overcoming the above problem, a compensation means is applied to the touch panel, such as summing the electrode pattern layer 13 at the four corners of the touch panel 10. The equipotential lines are thereby improved, as shown in FIG. 5, and become linear.

SUMMARY OF THE INVENTION

One particular aspect of the present invention is to provide a device for improving the detection accuracy of a touch point on a touch panel and a method thereof, wherein the detection accuracy of the touch panel are improved by the solution for improving the linearity of the electric filed in the prior art.

In the device for improving the detection accuracy of a touch point on a touch panel, the touch panel is a substantial rectangle orderly surrounded by a first X side, a first Y side, a second X side, and a second Y side, and has a detection layer and a transparent substrate with the same substantial rectangle shape, where the detection layer is transparent and conductive and located above the transparent substrate. The device includes a detection source, a plurality of first and second X external conducting wires, a plurality of first and second Y external conducting wires, a current measurement unit, a current calculation unit, and a coordinate determination unit. The detection source further includes a first detection signal source and a second detection signal source. The plurality of first and second X external conducting wires can be respectively and simultaneously electrically coupled with or simultaneously separated from the first X side and the second X side of the touch panel. When being simultaneously electrically coupled, the touch panel receives a first detection signal of the first detection signal source and respectively generates a first current and a second current on the plurality of first and second X external conducting wires respectively. The plurality of first and second Y external conducting wires can be respectively and simultaneously electrically coupled with or separated from the first Y side and the second Y side of the touch panel. When being simultaneously electrically coupled, the touch panel receives a second detection signal of the second detection signal source and respectively generates a third current and a fourth current on the plurality of first and second Y external conducting wires respectively. The current measurement unit respectively measures the first current, the second current, the third current and the fourth current of the plurality of first and second X external conducting wires and the plurality of first and second Y external conducting wires, wherein the four currents are compared before the user touches the touch point and after the user touches the touch point. The current calculation unit respectively sums the first current, the second current, the third current and the fourth current of the plurality of first and second X external conducting wires and plurality of first and second Y external conducting wires before the user touches the touch point and also when the user touches the touch point. The coordinate determination unit determined an X coordinate and a Y coordinate of the location of the touch point according to the four total currents before the user touches the touch point and the four total currents when the user touches the touch point.

In the method for improving the detection accuracy of a touch point on a touch panel, the touch panel is a substantial rectangle orderly surrounded by a first X side, a first Y side, a second X side, and a second Y side and has a detection layer and a transparent substrate with the same substantial rectangle shape, where the detection layer is transparent and conductive and located above the transparent substrate. The method includes the following steps. A plurality of first and second X external conducting wires that have the same quantity are respectively provided around the detection layer located on the first X side and the second X side of the touch panel, and a plurality of first and second Y external conducting wires that have the same quantity are respectively provided around the detection layer located on the first Y side and the second Y side. A first detection signal source and a second detection signal source are provided. The plurality of first and second X external conducting wires are electrically coupled with the detection layer located on the first X side and the second X side of the touch panel, and the plurality of first and second Y external conducting wires are electrically separated from the detection layer located on the first Y side and the second Y side according to the plurality of first and second X external conducting wires receives a first detection signal from the first detection signal source, wherein a first current and a second current are respectively generated on the plurality of first and second X external conducting wires. The plurality of first and second Y external conducting wires are electrically coupled with the detection layer located on the first Y side and the second Y side of the touch panel, and the plurality of first and second X external conducting wires are electrically separated from the detection layer located on the first X side and the second X side according to the plurality of first and second Y external conducting wires receives a second detection signal from the second detection signal source, wherein a third current and a fourth current are respectively generated on the plurality of first and second Y external conducting wires. The first current and the second current on the plurality of first and second X external conducting wires are respectively summed to obtain a first total current and a second total current, and the third current and the fourth current on the plurality of first and second Y external conducting wires are respectively summed to obtain a third total current and a fourth total current, and thus the four total current of before the user touches the touch point and the four total current of when the user touches the contact point are determined and the difference values of the four total currents can thus be determined. The difference values of the first total current and the second total current are used to calculate a x coordinate of the location of the touch point, and the difference values of the third total current and the change of the fourth total current are used to calculate a y coordinate of the location of the touch point.

In one embodiment, the touch panel is a capacitive touch panel or a five-wire resistive touch panel.

By using the present invention, the linearity of the capacitive touch panel and the five-wire resistive touch panel is improved, and the detection accuracy of the contact point is also improved.

For further understanding of the invention, reference is made to the following detailed description illustrating the embodiments and examples of the invention. The description is for illustrative purpose only and is not intended to limit the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

The present invention discloses a device for improving the detection accuracy of a touch point on a touch panel and a method thereof that is illustrated in detail by referring to the following embodiment and figures.

Figure 6:
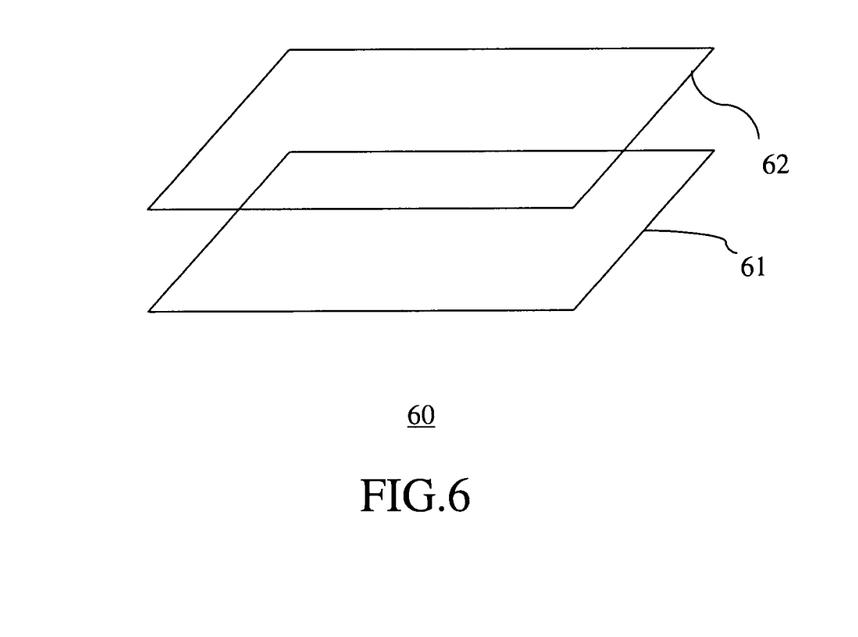
FIG. 6 is an exploded perspective view of the touch panel of the present invention.

Reference is made to FIG. 6, which shows an exploded perspective view of the touch panel. The touch panel 60 includes a transparent substrate layer 61 and a detection layer 62, and the touch panel 60 can be a capacitive touch panel or a five-wire resistive touch panel. The transparent substrate layer 61 can be a glass substrate layer. The detection layer 62 is formed on the transparent substrate layer 61. The shape of the detection layer 62 is the same as the transparent substrate layer 61, and the detection layer 62 is transparent and conductive. For examples, the touch panel 60 can be a substantial rectangle, and the detection layer 62 and the transparent substrate layer 61 have the same substantial rectangle shape. Furthermore, on the detection layer 62, there is a $SiO_2$ layer (not shown in the figure) for protecting the detection layer 62. The detection layer 62 are provided with a plurality of external detection signals for detecting the location of a touch point on the detection layer 62 and the $SiO_2$ layer.

Figure 7:
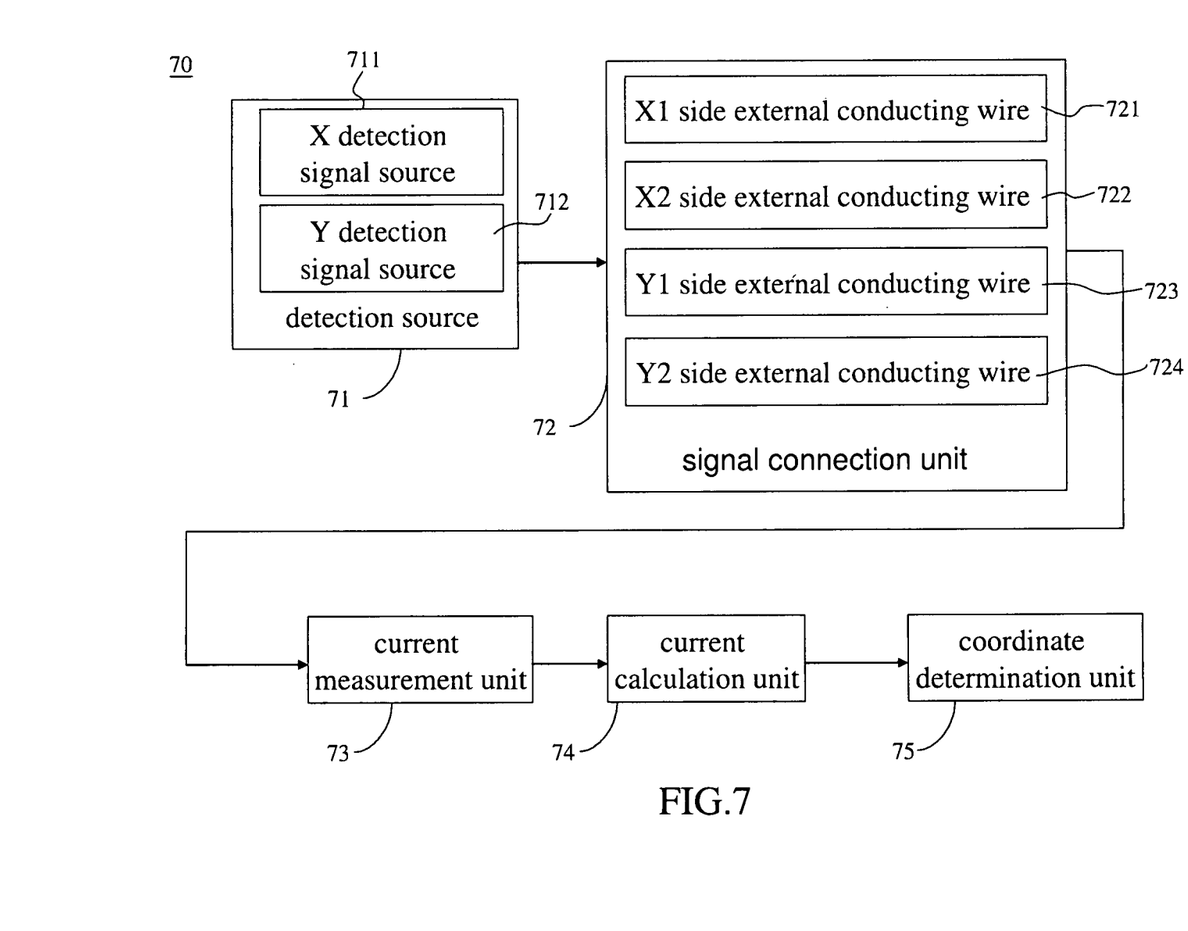
FIG. 7 is a functional block of the device for improving the detection accuracy of a touch point on a touch panel of the present invention.

FIG. 7 is a functional block of the device for improving the detection accuracy of a touch point on a touch panel of the present invention. The device 70 includes a detection source 71, a signal connection unit 72, a current measurement unit 73, a current calculation unit 74, and a coordinate determination unit 75. The detection source 71 includes an X detection signal source 711 and a Y detection signal source 712. The signal connection unit 72 includes a plurality of first and second X external conducting wires 721, 722 on the X1 side and the X2 side, and a plurality of first and second Y external conducting wires 723, 724 on the Y1 side and the Y2 side. For examples, the touch panel is a substantially rectangle orderly surrounded by a first X side, a first Y side, a second X side, and a second Y side.

Figure 8:
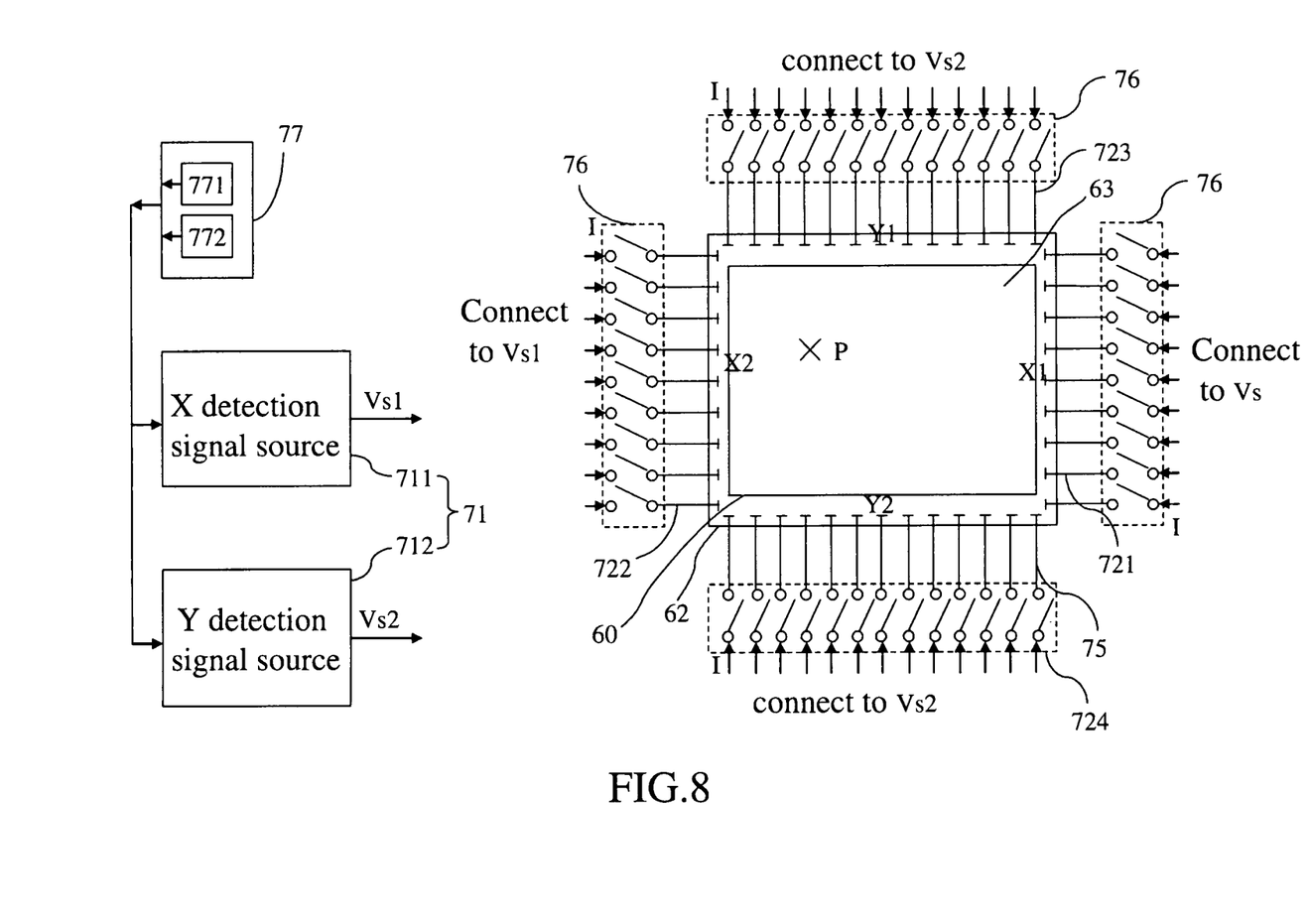
FIG. 8 is a top view of the device for improving the detection accuracy of a touch point on a touch panel of the present invention.

FIG. 8 is a top view of the device for improving the detection accuracy of a touch point on a touch panel of the present invention. The detection layer 62 of the touch panel 60 has two X sides X1, X2, two Y sides Y1, Y2, and an operation area 63. A touch point P is operated by touching on the operation area 63. The plurality of first and second X external conducting wires 721, 722 on the X1 side and the X2 side have the same quantity and are respectively and electrically coupled with the two X sides X1, X2 that are located outside of the operation area 63, and the plurality of first and second Y external conducting wires 723, 724 on the Y1 side and the Y2 side have the same quantity and are respectively and electrically coupled with the two Y sides Y1, Y2 that are located outside of the operation area 63. The plurality of first and second X external conducting wires 721 and 722 receive the detection signals Vs1 from the X detection signal source 711 of the external detection signal source 71 and the plurality of first and second Y external conducting wires 723 and 724 receive the detection signals Vs2 from the Y detection signal source 712 of the external detection signal source 71, wherein currents I are respectively generated on the first and second X external conducting wires 721, 722 and the first and second Y external conducting wires 723, 724. In one embodiment, the X detection signal source 711 and the Y detection signal source 712 are the same external detection signal source, and the detection signals Vs1, Vs2 are the same detection signal. The reason that it is possible for the present invention to use the same external detection signal source, and thus use the same detection signal is further explained below.

In the present invention, the first and second X external conducting wires 721, 722 and the first and second Y external conducting wires 723, 724 alternatively and independently receive the detection signals Vs1, Vs2 of the X detection signal source 711 and the Y detection signal source 712. The key word here is independently. This means that the first and second X external conducting wires 721, 722 and the first and second Y external conducting wires 723, 724 are not electrically coupled with the detection layer 62 of the touch panel 60 at the same time for determining the x coordinate and the y coordinate of the touch point P location.

In one embodiment, a switch 76 is respectively located between the first and second X external conducting wires 721, 722 and the detection layer 62 and between the first and second Y external conducting wires 723, 724 and the detection layer 62. A controller 77 controls the switch 76 to make the first and second X external conducting wires 721, 722 and the first and second Y external conducting wires 723, 724 be electrically coupled with the detection layer 62 or be separated electrically from the detection layer 62. The controller 77 includes a first circuit unit 771 and a second circuit unit 772.

Next, the current measurement unit 73 measures the currents I to obtain the currents on the first and second X external conducting wires 721, 722 and the first and second Y external conducting wires 723, 724, including a first current, a second current, a third current and a fourth current.

The current calculation unit 74 respectively sums the first current on the first X external conducting wires 721, the second current on the second X external conducting wires 722, the third current on the first Y external conducting wires 723 and the fourth current on the second Y external conducting wires 724 to obtain a first total current I1, a second total current I2, a third total current I3 and a fourth total current I4. Besides, the current calculation unit 74 calculates the current difference values $\Delta I1$, $\Delta I2$, $\Delta I3$ and $\Delta I4$ of the first total current I1, the second total current I2, the third total current I3 and the fourth total current I4 of when the user touches the touch point P and before the user touches the touch point P respectively.

Finally, the x coordinate and the y coordinate of the location of the touch point P are determined by applying the current differences $\Delta I1$, $\Delta I2$, $\Delta I3$ and $\Delta I4$ in terms of relation represented by the following formulas.

$$x=(\Delta I1-\Delta I2)/(\Delta I1+\Delta I2) \quad (3)$$

$$y=(\Delta I3-\Delta I4)/(\Delta I3+\Delta I4) \quad (4)$$

Figure 9A:
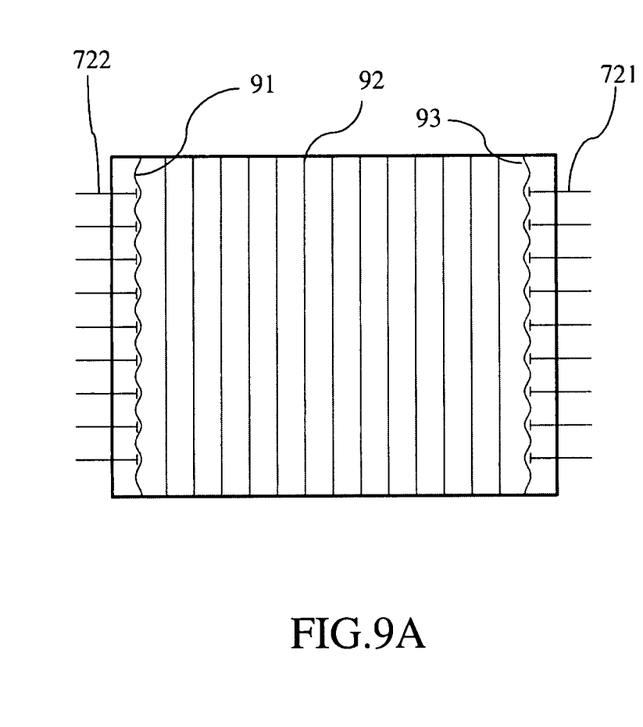
FIG. 9A and FIG. 9B are the schematic diagrams of the X part and Y part of the linearity of the touch panel improved by the device for improving the detection accuracy of a touch point on a touch panel of the present invention.
Figure 9B:
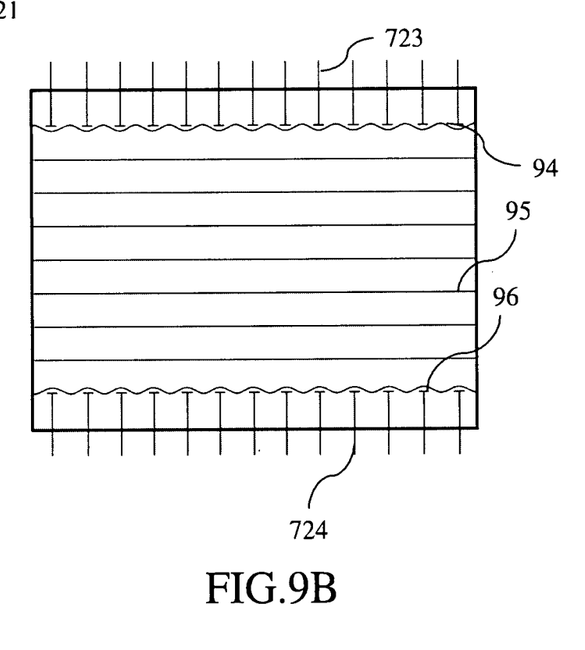

FIG. 9A and FIG. 9B are the schematic diagrams of the X part and Y part of the linearity of the touch panel improved by the device for improving the detection accuracy of a touch point on a touch panel of the present invention. As shown in FIGS. 9A, 9B, and 5, the linearity of the equipotential lines 91, 92, 93, 94, 95, 96 formed by the first and second X external conducting wires 721, 722 and the first and second Y external conducting wires 723, 724 are improved when compared to prior art's FIGS. 3 and 4.

Figure 10:
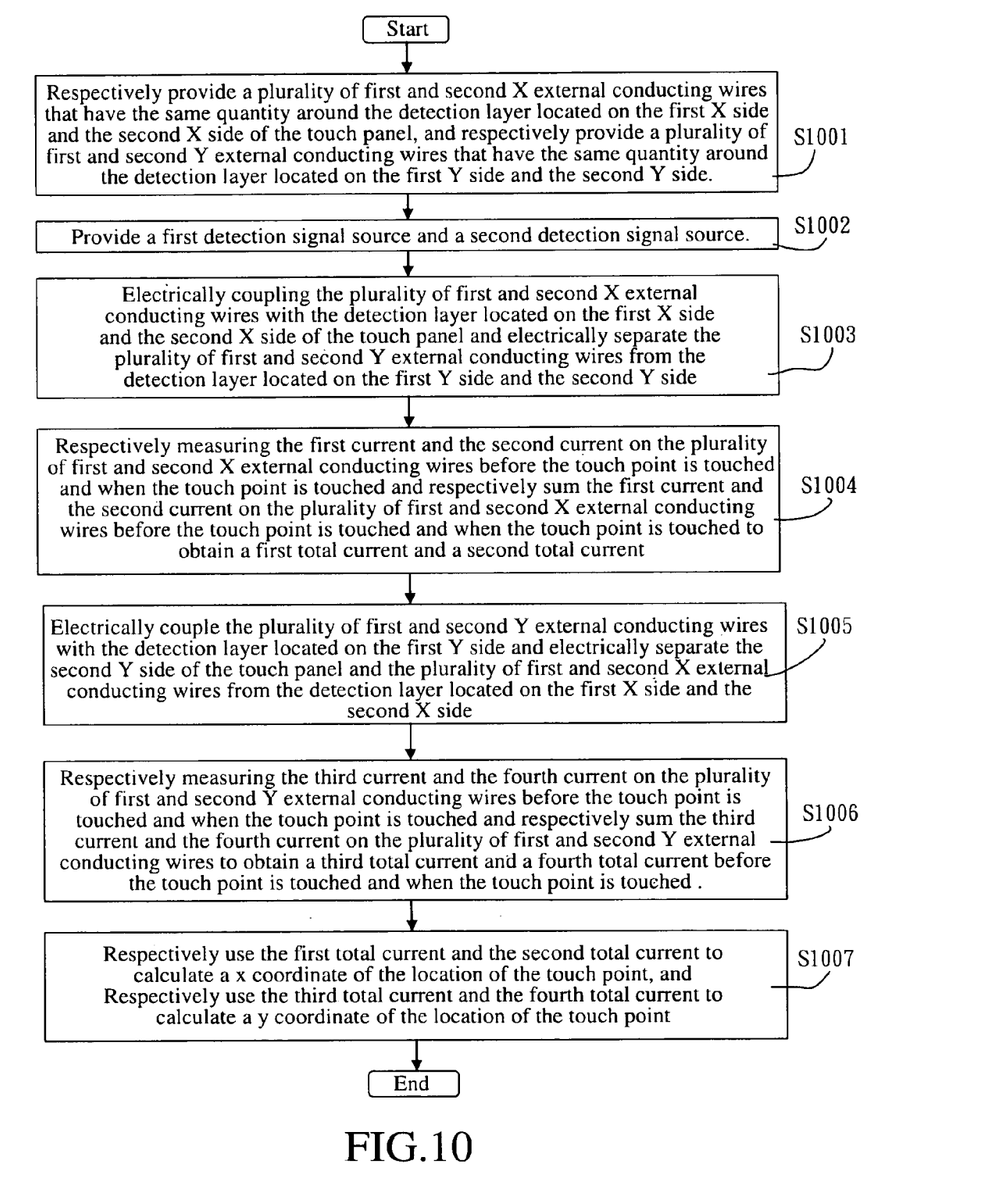
FIG. 10 is a flow chart of the method for improving the detection accuracy of a touch point on a touch panel of the present invention.

FIG. 10 is a flow chart of the method for improving the detection accuracy of a touch point on a touch panel of the present invention. The method can be applied to the device in FIG. 6. Please also refer to FIG. 6 in conjunction with FIG. 10.

As shown in FIG. 10, firstly, a plurality of first and second X external conducting wires 721, 722 that have the same quantity are respectively provided around the detection layer 62 located on the two X sides X1, X2 of the touch panel 60, and a plurality of first and second Y external conducting wires 723, 724 that have the same quantity are respectively provided around the detection layer 62 located on the two Y sides Y1, Y2 (S1001).

A first detection signal source 711 and a second detection signal source 712 are provided (S1002).

Next, the plurality of first and second X external conducting wires 721, 722 are electrically coupled with the detection layer 62 located on the two X sides X1, X2 of the touch panel 60 and the plurality of first and second Y external conducting wires 723, 724 are electrically separated from the detection layer 62 located on the two Y sides Y1, Y2 of the touch panel 60, wherein the plurality of first and second X external conducting wires 721, 722 receives a first detection signal Vs1 from the first detection signal source 711 (S1003). The currents I on the plurality of first and second X external conducting wires 721, 722 of the X1 side and the X2 side are measured respectively and then summed to obtain the total currents I1, I2 before the touch point is touched and when the touch point is touched (S1004).

Next, the plurality of first and second Y external conducting wires 723, 724 are electrically coupled with the detection layer 62 located on the two Y sides Y1, Y2 of the touch panel 60, and the plurality of first and second X external conducting wires 721, 722 are electrically separated from the detection layer 62 located on the two X sides X1, X2 so that the plurality of first and second Y external conducting wires 723, 724 receives a second detection signal Vs2 from the second detection signal source 712 (S1005). The currents I on the plurality of first and second Y external conducting wires 723, 724 of the Y1 side and the Y2 side are measured respectively and then summed to obtain the total currents I3, I4 before the touch point is touched and when the touch point is touched (S1006).

The difference value $\Delta I1$ of the total currents I1 before the touch point is touched and when the touch point is touched and the difference value $\Delta I2$ of the total currents I2 before the touch point is touched and when the touch point is touched are used for calculating the x coordinate of the location of the touch point P, and the difference value $\Delta I3$ of the total currents I3 before the touch point is touched and when the touch point is touched and the difference value $\Delta I4$ of the total currents I4 before the touch point is touched and when the touch point is touched are used for calculating the y coordinate of the location of the touch point P (S1007). The coordinate (x,y) of the location of the touch point P is determined by the following formulas.

$$x=(\Delta I1-\Delta I2)/(\Delta I1+\Delta I2) \quad (5)$$

$$y=(\Delta I3-\Delta I4)/(\Delta I3+\Delta I4) \quad (6)$$

$\Delta I1$, $\Delta I2$, $\Delta I3$ and $\Delta I4$ are the current difference values of the I1, I2, I3 and I4 when the user touches the touch point P and before the user touches the touch point P respectively.

In one embodiment, steps S1003 and S1004 are alternatively performed by providing a switch 66 (not shown) between the plurality of first and second X external conducting wires 721, 722 and the plurality of first and second Y external conducting wires 723, 724. The switch 66 (not shown) is used to control the electrical coupling with or separation of the plurality of first and second X external conducting wires 721, 722 and the plurality of first and second Y external conducting wires 723, 724.

In one embodiment of the present invention, A device for improving the detection accuracy of a touch point on a touch panel, comprising: a detection layer, a plurality of first switches, a plurality of second switches, a plurality of first X external conducting wires, a plurality of second X external conducting wires, a plurality of first Y external conducting wires, and a plurality of second Y external conducting wires.

The detection layer is orderly surrounded by a first X side, a first Y side, a second X side and a second Y side, wherein the detection layer is transparent and conductive, wherein the detection layer is a substantial rectangle with four sides including the first X side, the first Y side, the second X side, and the second Y side. Moreover, the detection layer comprises a substantial rectangular operation area, wherein the touch point is operated by touching on the operation area.

Besides, each of the plurality of first switch turn on/off according to a first control signal and each of the plurality of second switch turn on/off according to a second control signal, wherein the first control signal and the second control signal control to turn on/off the plurality of first switches and the plurality of second switches alternatively.

Furthermore, each of the plurality of first X external conducting wires is controlled to couple with the first X side by one of the plurality of first switches respectively, each of the plurality of second X external conducting wires is controlled to couple with the second X side by one of the plurality of first switches respectively. Each of the plurality of first Y external conducting wires is controlled to couple with the first Y side by one of the plurality of second switches respectively, and each of the plurality of second Y external conducting wires is controlled to couple with the second Y side by one of the plurality of second switches respectively.

The embodiment further comprises a transparent substrate below the detection layer and a detection source, wherein the transparent substrate has the same shape as the detection. the detection source provides a first detection signal for the plurality of first X external conducting wires and the plurality of second X external conducting wires, and the detection source provides a second detection signal for the plurality of first Y external conducting wires and the plurality of second Y external conducting wires.

The embodiment further comprises a current measurement unit, a current calculation unit, and a coordinate determination unit. The current measurement unit respectively measures a first current, a second current, a third current and a fourth current on each of the plurality of first external conducting wires and the plurality of second X external conducting wires and the plurality of first external conducting wires and the plurality of second Y external conducting wires before a touch point is touched and when the touch point is touched. The current calculation unit respectively sums all of the first currents, all of the second currents, all of the third currents and all of the fourth currents before the touch point is touched and also when the touch point is touched. The coordinate determination unit determines an x coordinate and a y coordinate of the location of the touch point according to the sums of the first current, the second current, the third current and the fourth current before the user touches the touch point and when the user touches the touch point.

The X coordinate and the y coordinate of the location of the touch point is determined by relation represented by the following formulas:

$$x=(\Delta I1-\Delta I2)/(\Delta I1+\Delta I2)$$

$$y=(\Delta I3-\Delta I4)/(\Delta I3+\Delta I4)$$

wherein the $\Delta I1$, $\Delta I2$, $\Delta I3$ and $\Delta I4$ are the difference values of sums of the first current, the second current, the third current, and the fourth current when the touch point is touched and before the touch point is touched respectively. By using the present invention, the distribution of the electric filed of the operation area of the touch panel would be uniform, and the linearity is improved. Therefore, the detection accuracy of the touch point's location is enhanced.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A device for improving a detection accuracy of a touch point on a touch panel, wherein the touch panel is a substantial rectangle orderly defined by a first X side, a first Y side, a second X side, and a second Y side, and has a detection lay er and a transparent substrate with the same substantial rectangle shape, where the detection layer is transparent and conductive and located above the transparent substrate, comprising:

a detection source having a first detection signal source and a second detection signal source;

a plurality of first X external conducting wires and a plurality of second X external conducting wires respectively and simultaneously electrically coupled to or separated from the first X side and the second X side of the touch panel, wherein when the first X external conducting wires and the second X conducting wires respectively and simultaneously electrically coupled to the first X side and the second X side of the touch panel, both the first X side and the second X side of the touch panel receive a first detection signal of the first detection signal source simultaneously so that the first X side and the second X side are substantially the same in potential, causing the first X external conducting wires and the second X conducting wires to respectively generate a first current and a second current;

a plurality of first Y conducting wires and a plurality of second Y external conducting wires respectively and simultaneously electrically coupled to or separated from the first Y side and the second Y side of the touch panel, wherein when the first Y external conducting wires and the second Y external conducting wires respectively and simultaneously electrically coupled to the first Y side and the second Y side, both the first Y side and the second Y side of the touch panel receive a second detection signal of the second detection signal source simultaneously so that the first Y side and the second Y side are substantially equal in potential, causing the first Y external conducting wires and the second Y external conducting wires to respectively generate a third current and a fourth current;

a current measurement unit respectively measuring the first currents, the second currents, the third currents, and the fourth currents of the first X external conducting wires, the second X external conducting wires, the first Y external conducting wires, and the second Y external conducting wires before the touch point is touched and when the touch point is touched;

a current calculation unit respectively summing the first currents, the second currents, the third currents, and the fourth currents of the first X external conducting wires, the second X external conducting wires, the first Y external conducting wires, and the second Y external conducting wires before the touch point is touched and also when the touch point is touched; and a coordinate determination unit determining an x coordinate and a y coordinate of a location of the touch point according to the first currents, the second currents, the third currents, and the fourth currents before the touch point is touched and when the touch point is touched.

2. The device for improving the detection accuracy of the touch point on the touch panel as claimed in claim 1, further comprising a plurality of first switches, a plurality of second switches, and a controller, wherein the first switches are respectively located between the first X external conducting wires and the second X external conducting wires and the first X side and the second X side, and the second switches are respectively located between the first Y external conducting wires and the second Y external conducting wires and the first Y side and the second Y side, wherein the first and second switches are controlled by the controller to cause the first X external conducting wires and the second X external conducting wires to be respectively electrically coupled to or electrically separated from the first X side and the second X side of the touch panel, and to cause the first Y external conducting wires and the second Y external conducting wires to be respectively electrically coupled to or electrically separated from the first Y side and the second Y side of the touch panel.

3. The device for improving the detection accuracy of the touch point on the touch panel as claimed in claim 1, wherein the first detection signal source is the same as the second detection signal source, and the first detection signal is the same as the second detection signal.

4. The device for improving the detection accuracy of the touch point on the touch panel as claimed in claim 1, wherein the touch panel further comprises a substantial rectangular operation area, and the touch point is operated by being touched on the operation area.

5. The device for improving the detection accuracy of the touch point on the touch panel as claimed in claim 1, wherein the touch panel is a capacitive touch panel or a five-wire resistive touch panel.

6. The device for improving the detection accuracy of the touch point on the touch panel as claimed in claim 1, wherein the X coordinate and the y coordinate of the location of the touch point is determined by relation represented by the following formulas:

$$x = (\Delta I1 - \Delta I2)/(\Delta I1 + \Delta I2)$$

$$y = (\Delta I3 - \Delta I4)/(\Delta I3 + \Delta I4)$$

wherein $\Delta I1$, $\Delta I2$, $\Delta I3$ and $\Delta I4$ are differences of the first currents, the second currents, the third currents, and the fourth currents when the touch point is touched and before the touch point is touched respectively.

7. A method for improving a detection accuracy of a touch point on a touch panel, wherein the touch panel is a substantial rectangle orderly defined by a first X side, a first Y side, a second X side, and a second Y side and has a detection layer and a transparent substrate with the same substantial rectangle shape, where the detection layer is transparent and conductive and located above the transparent substrate, the method comprising:

respectively providing a plurality of first X external conducting wires and a plurality of second X external conducting wires, with the first X external conducting wires and the second external conducting wires being same in number and around the detection layer located on the first X side and the second X side of the touch panel, and respectively providing a plurality of first Y external conducting wires and a plurality of second Y external conducting wires, with the first Y external conducting wires and the second Y conducting wires being same in number and around the detection layer located on the first Y side and the second Y side;

providing a first detection signal source and a second detection signal source;

respectively electrically coupling the first X external conducting wires and the second X external conducting wires to the detection layer located on the first X side and the second X side of the touch panel and respectively electrically separating the first Y external conducting wires and the second Y external conducting wires from the detection layer located on the first Y side and the second Y side so that the first X side and the second X side are simultaneously coupled to a first detection signal from the first detection signal source, resulting in the first X side and the second X side substantially equal in potential, wherein a first current and a second current are respectively generated on the first X external conducting wires and the second X external conducting wires;

respectively electrically coupling the first Y external conducting wires and the second Y external conducting wires to the detection layer located on the first Y side and the second Y side and respectively electrically separating the first X external conducting wires and the second X external conducting wires from the detection layer located on the first X side and the second X side so that the first Y side and the second Y side are simultaneously coupled to a second detection signal from the second detection signal source, resulting in the first Y side and the second Y side substantially equal in potential, wherein a third current and a fourth current are respectively generated on the first Y external conducting wires and the second Y external conducting wires;

respectively measuring the first currents and the second currents on the first X external conducting wires and the second X external conducting wires before the touch point is touched and when the touch point is touched, and respectively measuring the third currents and the fourth currents on the first Y external conducting wires and the second Y external conducting wires before the touch point is touched and when the touch point is touched;

respectively summing the first currents and the second currents on the first X external conducting wires and the second X external conducting wires before the touch point is touched and when the touch point is touched to obtain a first total current and a second total current, and respectively summing the third currents and the fourth currents on the first Y external conducting wires and the second Y external conducting wires to obtain a third total current and a fourth total current before the touch point is touched and when the touch point is touched; and respectively using the first total current and the second total current to calculate a x coordinate of a location of the touch point, and respectively using the third total current and the fourth total current to calculate a y coordinate of the location of the touch point.

8. The method for improving the detection accuracy of the touch point on the touch panel as claimed in claim 7, wherein the step for electrically coupling the first X external conducting wires and the second X external conducting wires to the detection layer located on the first X side and the second X side of the touch panel and electrically separating the first Y external conducting wires and the second Y external conducting wires from the detection layer located on the first Y side and the second Y side further comprises a step for opening elements electrically coupled between the first X external conducting wires and the second X external conducting wires and the first X side and the second X side of the touch panel, and a step for closing the elements electrically coupled between the first Y external conducting wires and the second Y external conducting wires and the first Y side and the second Y side of the touch panel; and the step of electrically coupled the plurality of first and second Y external conducting wires with the detection layer located on the first Y side and electrically separate the second Y side of the touch panel and the plurality of first and second X external conducting wires from the detection layer located on the first X side and the second X side further comprises a step for closing an element electrically coupled between the plurality of first and second X external conducting wires and the first and second X side of the touch panel, and a step for opening an element electrically coupled between the plurality of first and second Y external conducting wires and the first and second Y side of the touch panel.

9. The method for improving the detection accuracy of the touch point on the touch panel as claimed in claim 7, wherein the first detection signal source is the same as the second detection signal source, and the first detection signal is the same as the second detection signal.

10. The method for improving the detection accuracy of the touch point on the touch panel as claimed in claim 7, wherein the touch panel further comprises a substantial rectangular operation area, and the touch point operates by being touched on the operation area.

11. The method for improving the detection accuracy of the touch point on the touch panel as claimed in claim 7, wherein the touch panel is a capacitive touch panel or a five-wire resistive touch panel.

12. The method for improving the detection accuracy of the touch point on the touch panel as claimed in claim 7, wherein the x coordinate and the y coordinate of the location of the touch point is determined by the relation represented by the following formulas:

$$x=(\Delta I1-\Delta I2)/(\Delta I1+\Delta I2)$$

$$y=(\Delta I3-\Delta I4)/(\Delta I3+\Delta I4)$$

wherein $\Delta I1$, $\Delta I2$, $\Delta I3$ and $\Delta I4$ are differences of the first currents, the second currents, the third currents, and the fourth currents when the touch point is touched and before the touch point is touched.

* * * * *